United States Patent [19]

Smelser

[11] Patent Number: 5,846,274
[45] Date of Patent: Dec. 8, 1998

[54] MANHOLE BIOFILTER

[75] Inventor: Sherisse R. Smelser, Albuquerque, N. Mex.

[73] Assignee: City of Albuquerque, Albuquerque, N. Mex.

[21] Appl. No.: 901,044

[22] Filed: Jul. 28, 1997

[51] Int. Cl.⁶ .................................................. B01D 46/30
[52] U.S. Cl. .............................. 55/381; 55/385.2; 55/479
[58] Field of Search ...................... 55/381, 385.2, 55/223, 233, 479; 95/92; 213; 210/151, 601, 603

[56] References Cited

U.S. PATENT DOCUMENTS

| | | |
|---|---|---|
| 3,475,885 | 11/1969 | Kline . |
| 3,524,304 | 8/1970 | Wittemeler et al. ..................... 55/381 |
| 3,853,508 | 12/1974 | Gordon et al. ......................... 55/381 |
| 4,149,863 | 4/1979 | Ballard ................................... 55/381 |
| 4,161,426 | 7/1979 | Kneer ..................................... 55/479 |
| 4,304,579 | 12/1981 | Grannville et al. ..................... 55/381 |
| 4,586,941 | 5/1986 | Cooley . |
| 4,662,900 | 5/1987 | Ottengraf ............................... 55/233 |
| 4,734,111 | 3/1988 | Hoffmann et al. ..................... 55/233 |
| 5,316,569 | 5/1994 | Heunermund . |
| 5,431,808 | 7/1995 | Zumbragel ............................. 95/92 |
| 5,527,454 | 6/1996 | Ponte et al. . |

Primary Examiner—Jay H. Woo
Assistant Examiner—Minh-Chau T. Pham
Attorney, Agent, or Firm—Dickson G. Kehl; Rod D. Baker; Jeffrey D. Myers

[57] ABSTRACT

A biofilter for use in a manhole of a sanitary sewer system which allows sewer gases to escape from the system driven by the pressure differential between the aboveground atmosphere and the underground pressure. Sewer gases are chemically changed by their passage through the compost filter media, and odors associated with the gases are thereby eliminated.

15 Claims, 8 Drawing Sheets

MANHOLE BIOFILTER

BACKGROUND OF THE INVENTION

1. Field of the Invention (Technical Field)

The present invention relates to filters for sewer systems.

2. Background Art

The present invention is a compost filter which can be fitted into the neck portion of a sanitary sewer manhole of any size, to reduce or eliminate offensive odors associated with sewer gases that vent to the atmosphere from the manhole. Gaseous compounds are prevalent in municipal sewer systems and cause odor problems (e.g., hydrogen sulfide, methyl mercaptan, organic sulfides, amines and other nitrogen-containing compounds, and especially sulphur-containing compounds, generated at the bottom of a manhole).

Very little is known in the prior art for use in a manhole to treat odors escaping into the atmosphere of a neighborhood, caused by the escape of malodorous gaseous compounds such as those associated with sewage. It is known to use activated carbon, e.g., activated carbon impregnated with a reagent which is reactive toward malodorous compounds, to adsorb these compounds. U.S. Pat. No. 4,586,941, to Cooley describes the use of an activated carbon-impregnated adsorption apparatus that fits into a manhole and allows sewer gases driven by positive pressure to vent through the activated carbon. By utilizing an adsorption filter device, this arrangement inherently requires frequent maintenance to replace the adsorption filter which becomes saturated with the compounds being treated, e.g., sulphur compounds, thus halting the adsorption process. Because of known difficulties associated with allowing the adsorption apparatus to get wet, Cooley's invention is heavily directed to a structural arrangement designed to prevent the adsorption filter from getting wet.

Various systems for waste treatment and deodorization are known; however, the typical apparatus is designed either for use in a municipal/industrial waste water treatment plant or alternatively for use in an individual building. U.S. Pat. No. 5,527,454 to Ponte et al. discloses a trickling filter, absent a filter cover or dome, for treating and purifying waste water that includes a bed of filter media adapted to receive and support aerobic bacteria for reacting with the waste water. Fans, vent pipes, and air-discharge ducts act to create a downward flow and channel the reacted air to a scrubber for filtering and deodorizing. This arrangement is designed exclusively for incorporation in rock media trickling filters. U.S. Pat. No. 5,316,569 to Heunermund is directed to a complex device for filtering sewer gases that includes upper and lower filter chambers, each chamber having filter media. In this invention, carbon is the preferred filter medium for the lower chamber, and copper steel and a silver coil is combined as the filter media for the upper chamber. The device is designed for connection to a house sewer vent. U.S. Pat. No. 3,475,885 to Kline is directed to a three-part retainer for the purifying agent used in sewer line vent pipes to purify escaping gases. According to the invention, the purifying agent is retained in an annular space disposed around the existing vent pipe, and gases must pass upwardly through the purifying medium. As with Heunermund, the invention is designed for use in the sewer system of an individual building.

SUMMARY OF THE INVENTION
(DISCLOSURE OF THE INVENTION)

A biofilter for sanitary sewer gas odor, preferably a compost filter, is described which fits in the neck portion of a sanitary sewer manhole shaft and utilizes existing pressure differentials between the sanitary sewer system underground and the ambient pressure aboveground as the driving force to move air through the filter. The subject invention is a biofilter for use inside the neck of a manhole of a sanitary sewer system, which comprises a basket means for holding a filter media, a means for removably positioning said basket means in the neck of the manhole, and a means for providing two-directional flow of gas through the biofilter. The basket means comprises netting means for containing said filter media, which may be compost, and a shape-retaining ring means disposed at the circumference of the neck of the basket means, which adjusts to fit the inner diameter of the neck of the manhole, and means for attaching said shape-retaining ring means to said basket means. The shape-retaining ring means may comprise a shelf means where the attaching means rests, and the basket means may comprise vertical containing structure for supporting said filter media, which may be a plurality of cables.

The means for removably positioning comprises vertical support means for retaining the biofilter in the manhole neck, which includes a holding means attached to the neck of the manhole and a fastening means attached to said shape-retaining ring means, whereby said fastening means rests on said holding means to removably position said basket means in the neck of the manhole.

The means for providing two-directional flow through the biofilter further comprises means for forcing the passage of gas through the biofilter, which may be a seal means disposed between said shape-retaining means and the manhole neck. The means for providing two-directional flow through the biofilter comprises a means for utilizing the atmospheric pressure differential between the sanitary sewer system underground and the ambient pressure aboveground to drive air through the biofilter. In the biofilter of the invention, gases in air moving upward through the biofilter are chemically changed and rendered odorless by said filter media, and air moving downward through the biofilter carries oxygen to the sewer system.

Finally, the biofilter of the invention is absent a barrier means for preventing entry and exit of ambient air to the sewer system and is absent a mechanical means for providing air flow through the biofilter.

A primary object of the present invention is to treat malodorous gases formed in a sewer system and to prevent their escape into the surrounding neighborhood.

A primary advantage of the present invention is the use of existing pressure differentials, rather than complex structure, fans, pumps, etc., to drive air through the filter.

Another advantage of the present invention is the use of bacterial and fungal activity to effect a chemical change in the malodorous sewer gases, thus eliminating the need for maintenance efforts to replace the filter.

Yet another advantage of the present invention is free passage of aboveground atmospheric air into the sanitary sewer atmosphere.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

Figure 1:
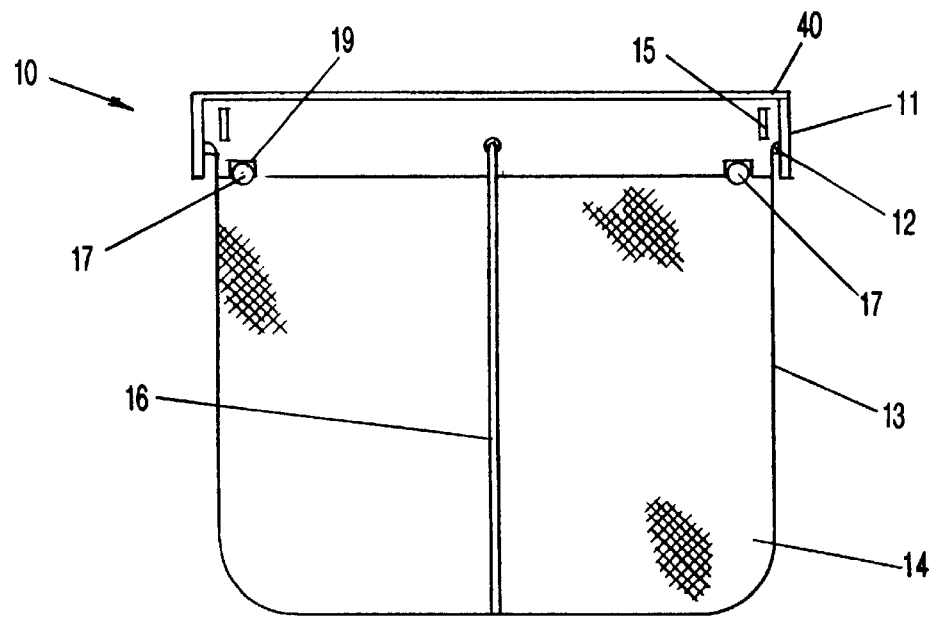
FIG. 1 is a cross-sectional view of one embodiment of the filter of the invention.

DESCRIPTION OF THE PREFERRED EMBODIMENTS (BEST MODES FOR CARRYING OUT THE INVENTION)

Sewer gases have traditionally been allowed to vent freely through manhole covers, which is offensive both to pedestrians and residents of the neighborhood where the manhole is located. The odor caused by these gases was formerly treated by simply plugging the sewer system or the manhole, but plugging causes a dangerous build-up of gases. Typical efforts to eliminate sewer odors have involved chemical treatment of the sewage and/or adsorption of odors in the main sewer lines or in filters at the manhole. Treatment at the manhole itself has been limited primarily to adsorption filters or apparatus. The use of adsorption treatment is personnel intensive since maintenance is frequently required to replace the filter (or other apparatus) due to its surface becoming saturated with gaseous, particularly sulfur, compounds. Additionally, care must be taken with adsorption apparatus to avoid the apparatus becoming wet, which is difficult in the naturally damp atmosphere of the sewer. The saturation of the adsorption filter, either with waste gases or with sewer water, halts the adsorption process and so limits the effective use of the filter.

Additionally, the filter media of these known filters may be a problem, in that the filter media causes a bacterial reaction with the gases, resulting, for hydrogen sulfides, in sulfuric acid. Over the time the filter is in use, the acid concentration increases to fairly high levels, and any disposal method for the saturated media must deal with the problems inherent in disposing of sulfuric acid. Using activated carbon, it can be difficult to safely dilute the sulfuric acid. Typically sodium hydroxide is used to neutralize the sulfuric acid after which it too becomes a disposal issue.

The subject invention is directed to a biofilter that fits in the neck portion of a sanitary sewer manhole shaft, just under the manhole cover. The biofilter of the invention is designed to treat sewer gases, particularly odorous air that is generated when hydrogen sulfide at the bottom of the manhole "exhales" from the sewer, especially in the summer.

The filter of the invention does not require pumps, blowers or other mechanical devices to create the air flow, but rather utilizes the atmospheric pressure differential between the sanitary sewer system underground and the ambient pressure aboveground as the driving force to move air through the filter. Depending on the value of the pressure differential, the air may move upward or downward through the filter. If the air flow is upward, sanitary sewer air laden with offensive gases will be chemically changed and rendered odorless by bacterial and fungal activity in the compost. If the air flow is downward, oxygen-rich atmospheric air is allowed to enter the sewer system, and thus the oxygen level in the sanitary sewer is maintained. An adequate amount of oxygen is required in the sanitary sewer system for two reasons: (1) the increase in concentration to dangerous levels of hazardous gases such as hydrogen sulfide and methane is prevented; and (2) the corrosion rate of concrete and metal structures is reduced, thus prolonging the lifetime of the most expensive infrastructure a public works department owns.

Figure 2:
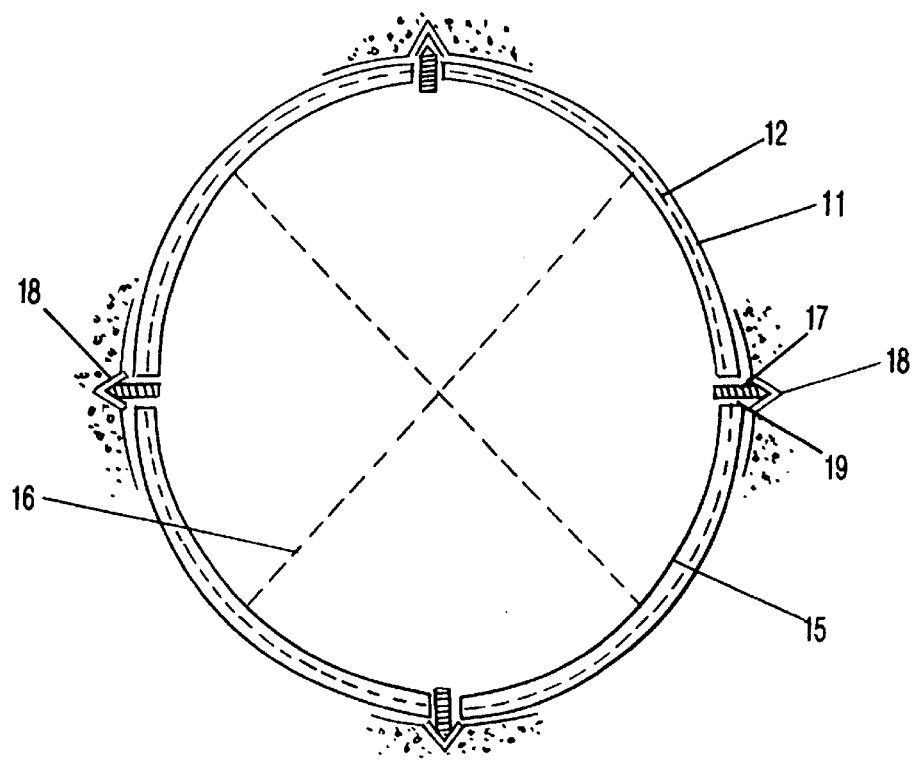
FIG. 2 is a top view of the first embodiment of the filter of the invention.

FIG. 1 is a cross-sectional view of a preferred embodiment of the manhole biofilter 10 of the invention, and FIG. 2 is a top view of the same embodiment. Biofilter 10 of the invention is generally circular in shape, when viewed from the top (shown in FIG. 2) and comprises a shape-holding ring structure 11, which allows biofilter 10 to match and fit into the inner diameter of the manhole neck. Ring structure 11 further comprises a shelf 12 upon which the mechanism for attaching the compost container 13 to the shape-holding ring structure 11 rests. Ring structure 11 and shelf 12 may be composed of an acid resistant material, e.g., stainless steel or high density polyethylene Biofilter 10 further comprises support structure 15 which further supports biofilter 10 in the manhole neck. In the first embodiment of the biofilter of the invention, shown in FIGS. 1 and 2, support structure 15 comprises a seating ring which rests on support shelf 12. Seating ring 15 attaches, or pins, the compost basket 14 to the shape-holding ring structure 11, by seating onto shelf 12 of the shape holding ring structure 11. The material of compost container 13 (typically acid resistant netting) is woven between shelf 12 and support structure 15 and held in place by pressure. In this embodiment, seating ring 15 may be structured as part of the upper circumference of compost container 13.

The shape-holding ring structure 11 may be secured by placing it in the manhole neck by drilling threaded, stainless steel anchors 18 into the manhole neck, threading stainless steel bolts 17 into the stainless steel anchors 18 in the manhole neck, first, and then placing the shape-holding structure 11 on top of the stainless steel bolts 17. The notches 19 are to restrict circumferential motion of the shape-holding structure 11 once it has been set on the stainless steel bolts 17, which extend beyond the interior manhole neck and into the stainless steel anchors 18.

Figure 3:
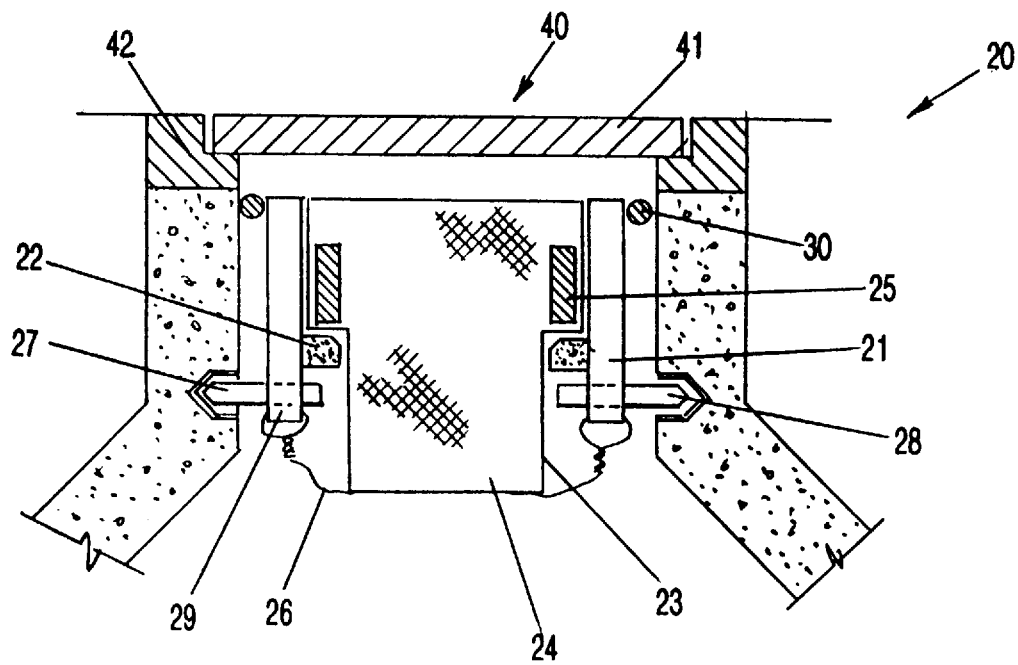
FIG. 3 is a cross-sectional view of an alternative embodiment of the filter of the invention.

Compost container 13 consists of a compost basket 14 that, as seen in FIGS. 1 and 3, comprises some form of netting that is air-permeable and acid resistant, e.g., a polyethylene material or a nylon netting. The netting material of the compost basket 14 is sized to retain the compost, to hold it in place, and to permit easy passage of the sewer gas through biofilter 10, preferably about one to two feet deep. Compost basket 14 may be cylindrical in shape though it is not limited to that shape. Compost container 13 further includes a vertical support structure 16 composed of acid-resistant material, e.g., stainless steel or plastic-coated cabling. As shown in FIGS. 1 and 2, support structure 16 may be cabling.

Figure 4:
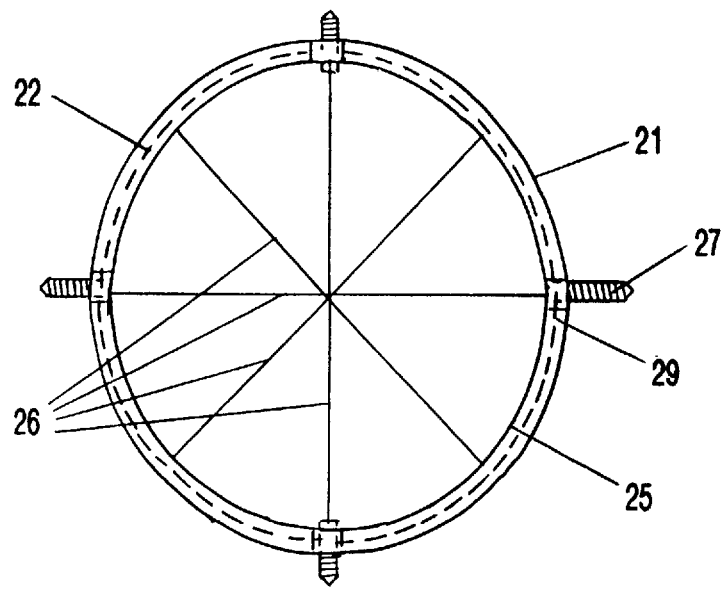
FIG. 4 is a top view of the alternative embodiment of the filter of the invention.

FIGS. 3 and 4 depict cross-section and top view, respectively, of an alternative embodiment of the biofilter of the invention, which primarily differs from the first embodiment in the means by which the shape-holding structure 11 is held and supported inside the manhole. In this alternative embodiment, like biofilter 10 of FIGS. 1 and 2, biofilter 20 of the invention is generally circular in shape (see the top in FIG. 4) and comprises a shape-holding ring structure 21, allowing biofilter 20 to match and fit into the inner diameter of the manhole neck. Ring structure 21 includes a shelf 22 on which the mechanism for attaching compost container 23 to the shape-holding ring structure 21 rests. Biofilter 20 further includes support structure 25 for supporting biofilter 20 in the manhole.

In this second embodiment of the biofilter of the invention, as shown in FIGS. 3 and 4, support structure 25 comprises a seating ring which rests on support shelf 22 and attaches compost basket 24 to shape-holding ring structure 21, by seating onto shelf 22 of the shape holding ring structure 21. As with biofilter 10 of FIGS. 1 and 2, the material of compost basket 24 is woven between shelf 22 and support structure 25 and held in place by pressure. In this second embodiment, however, support structure 25 further includes bolts 27 which thread through the shape-holding ring structure 21 and rest on threaded anchors 28 which are driven into the concrete of the manhole neck. As with the corresponding components of the first embodiment, in the second embodiment, ring structure 21, shelf 22, bolts 27 and threaded anchors 28 may be composed of an acid-resistant material, e.g., stainless steel.

In this embodiment the shape-holding ring structure 21 is secured in place in the manhole neck by drilling threaded, stainless steel anchors 28 into the manhole neck and threading stainless steel bolts 27 through channels 29 in the shape-holding structure 21, first, and then into the stainless steel anchors 28 placed in the manhole neck.

The preferred filter media of the sanitary sewer gas odor filter apparatus of the invention is approximately 50 pounds or 30 gallons of compost, even more preferably moist compost. The material of the compost may be any material, as long as it is loose or "unscreened"; however typical compost ingredients are (1) a nitrogen source, such as green plant material, grass clippings or sludge from a wastewater treatment plant, and (2) a carbon source such as chipped trees or shrubs or straw. In the presence of water and oxygen, microbial activity will create compost. A large particle size is maintained in the compost of the invention thus allowing the air flow in and out of the sewer system without forcing.

Compost provides bacteriological scrubbing as opposed to chemical scrubbing, i.e., it utilizes bacterial and fungal activity to chemically change the malodorous sanitary sewer gases, without the need for constant maintenance and replacement of the filter media. Typically compost media can last five years or more, whereas an adsorption media can expire in one month. The bacterial and fungal populations that occur naturally in compost utilize the sulfur compounds in the sewer gases, particularly hydrogen sulfide, in their life cycle processes. Thus, as long as the bacteria and fungi are present, sulfur-laden gases are being neutralized, and, unlike an adsorption process, the filter media does not become saturated with waste.

Also, advantageously, the presence of water in the sewer system encourages the colonization of the beneficial bacteria and fungi. If the compost filter media is placed into the compost container while wet, the damp atmosphere of the sanitary sewer will maintain the moisture. Likewise, drainage from wet weather events has no adverse affect on the compost.

Another advantage to the use of compost is that sulfuric acid in the compost mixture, created by the bacterial reaction of the hydrogen sulfide in the sewer with the filter media can be periodically rinsed and diluted by wet weather events into the sewage water below the manhole. Alternatively, if there is an extended dry weather period and the filter is not rinsed periodically, microbes in the same species, but which are more acid tolerant will colonize the filter media, therefore the cleansing action will continue indefinitely. Further, when compost is used, there is essentially no waste as the used compost is reincorporated in the composting process, for instance in a compost generation facility.

Both embodiments of the biofilter of the invention, biofilter 10, as shown in FIG. 1, and biofilter 20, as shown in FIG. 3, further comprise a manhole cover structure 40, a manhole cover 41, and a manhole ring 42. As depicted in FIG. 3, the biofilter 20 of the invention employs a sealing structure 30 disposed between the shape-retaining ring 11 and the manhole neck (not shown). Seal 30 forces sewer gases to travel through biofilter 10, and hence through the compost of the filter media, rather than "leaking" around the edges. Thus, chemical treatment of the gases by the bacteria in the compost is assured. Biofilter 10 is also, advantageously, absent a barrier that would prevent the entry of oxygen and nitrogen to the sewer system.

In operation, the biofilter of the invention is placed into the neck portion of the manhole shaft, just below the manhole ring 42 that supports the manhole cover 41. Locating the apparatus below the manhole ring 42 prevents the apparatus from interfering with the proper seating of the manhole cover 41. Unseated manhole covers may be dangerous to vehicles passing over the manhole, particularly if the wheels of the vehicles actually contact an unseated manhole cover. The method of the invention is that the odorous gases are treated by chemical reaction in the compost when the sewer "exhales", which is when the sewer temperature is warmer than the atmospheric air, such as desert summer nights, and the pressure is released creating an influx of ambient air to the sewer system when the sewer "inhales", which is when the sewer temperature is cooler than the atmospheric air, such as summer days. The same effect can be observed at an entrance to a cave or other similarly large underground structure.

Figure 5:
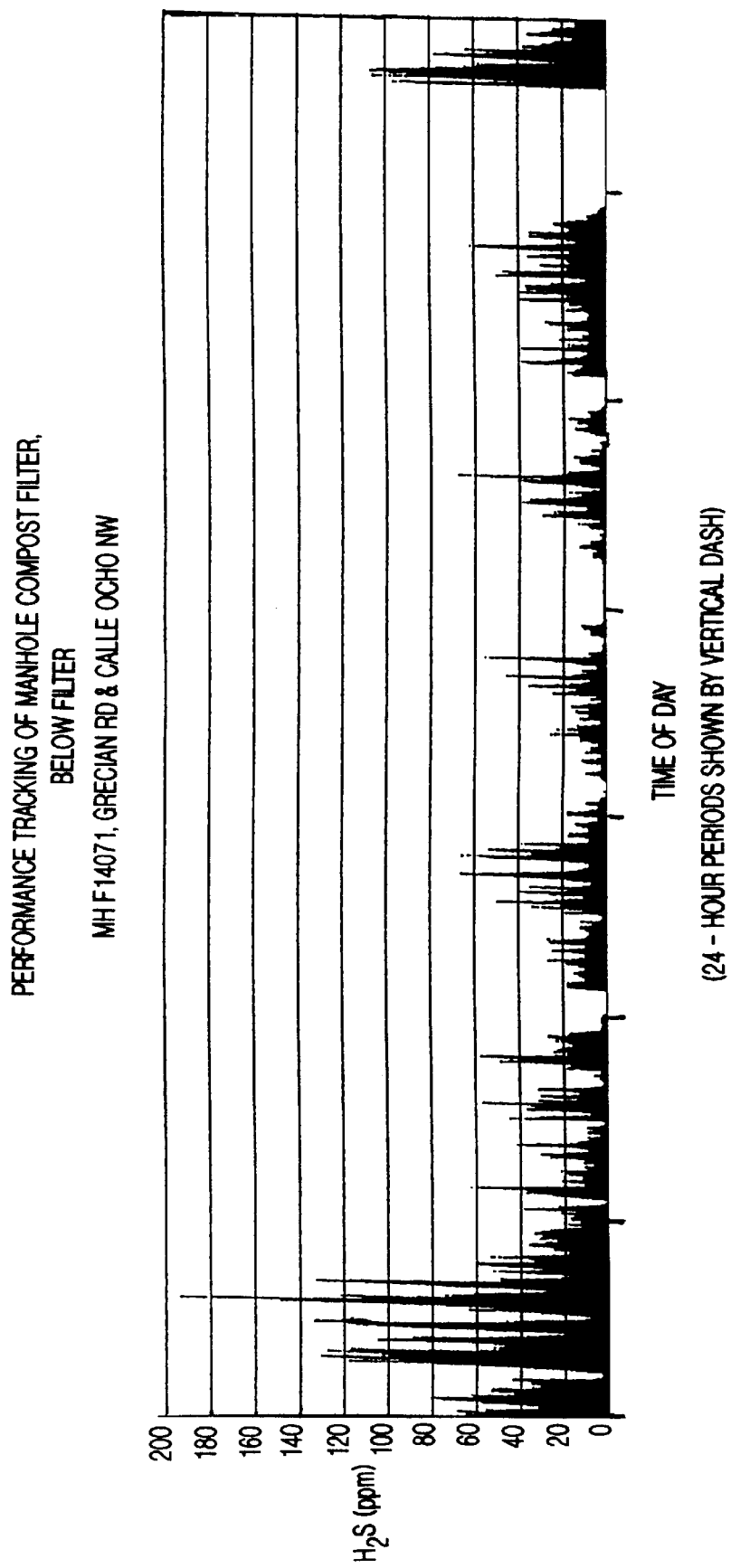
FIG. 5 is a graph of "below filter" hydrogen sulfide levels versus time for a first test of the biofilter of the invention.
Figure 6:
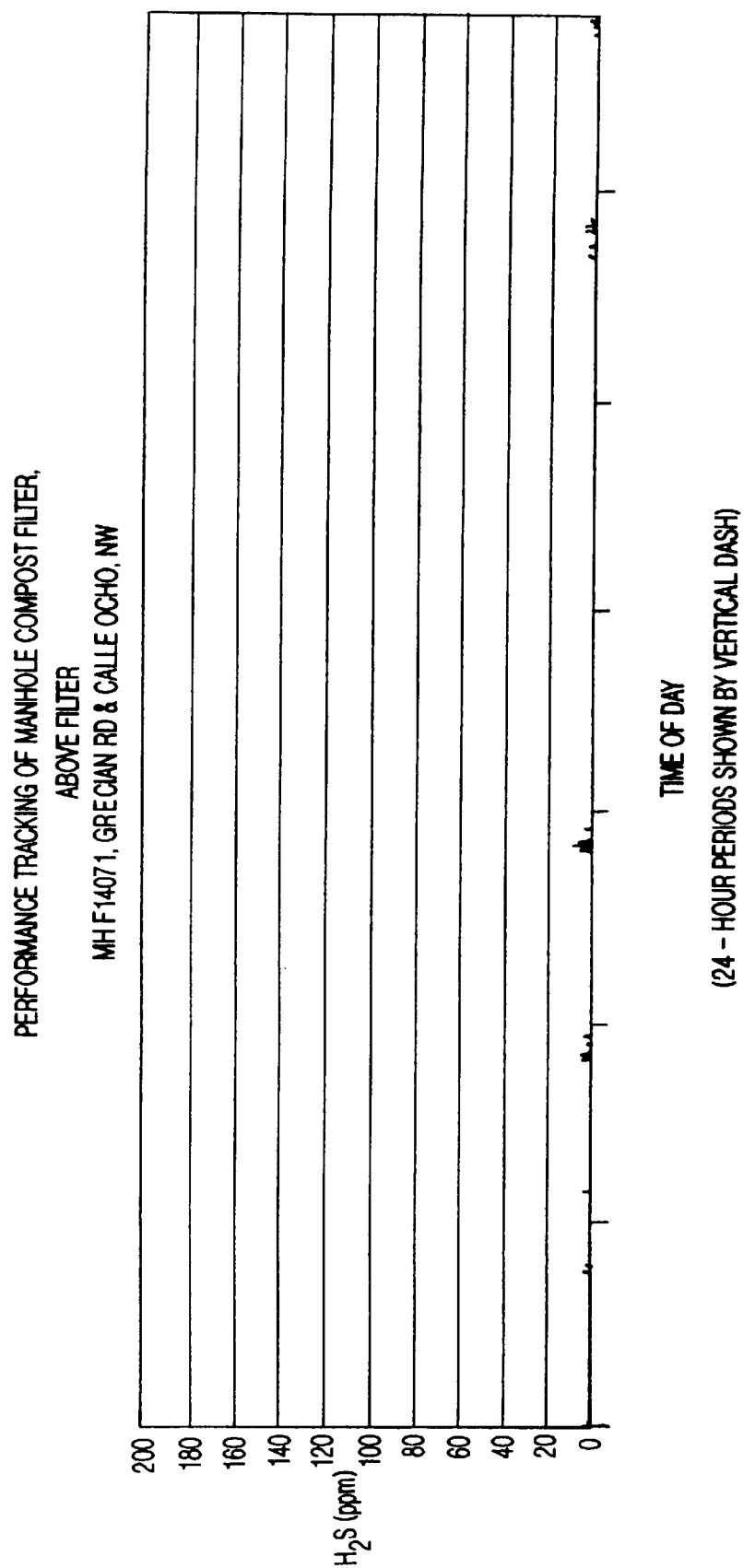
FIG. 6 is a graph of "above filter" hydrogen sulfide levels versus time for a first test of the biofilter of the invention taken at a later time.

The biofilter of the invention has been practically tested for performance. FIG. 5 provides a graph of hydrogen sulfide levels versus time of day below the biofilter of the invention placed in a manhole. FIGS. 6 and is a graph of hydrogen sulfide levels (in parts per million (ppm)) versus time of day showing performance results of the biofilter in the treated air above the manhole. The biofilter used for this test was as depicted in FIG. 3. The compost container having a diameter of 21 inches and depth of 18 inches (3.6 cubic feet) and containing approximately 30 gallons/50 pounds of compost mixture in the container 23. The shape-holding structure 21, shelf 22, seating ring 25, bolts 27, and anchors 28 were of stainless steel; support structure cabling 26 (not shown in this embodiment, see compost container vertical support structure 16 in first embodiment) was plastic coated cable; and compost woven basket 24 and the manhole sealing structure 30 were of polyethelene material. Compost utilized wastewater treatment sludge, biosolids, as the nitrogen source. The data in FIG. 6 registers small levels of hydrogen sulfide downstream, above, the filter corresponding to the greatest levels of hydrogen suldfide upstream, below, the filter. This indicates gases are passing through the filter and the invention is not acting as a plug, but as a filter. Some "breakthrough" can be anticipated with any filter mechanism and one uses average pollutant levels in designing a filter, not peaks.

Figure 7:
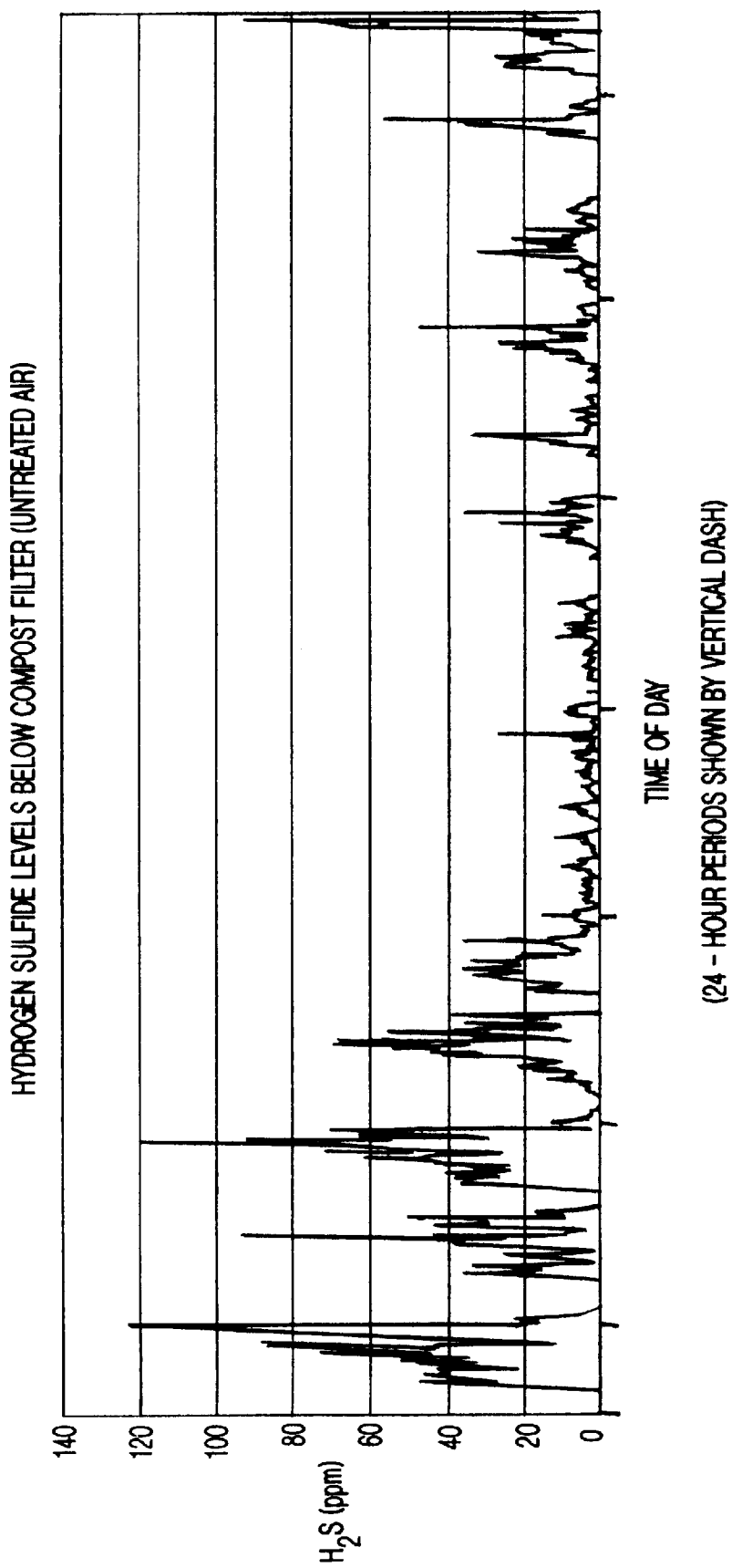
FIG. 7 is a graph of "below filter" hydrogen sulfide levels versus time of day for a second test of the biofilter of the invention.
Figure 8:
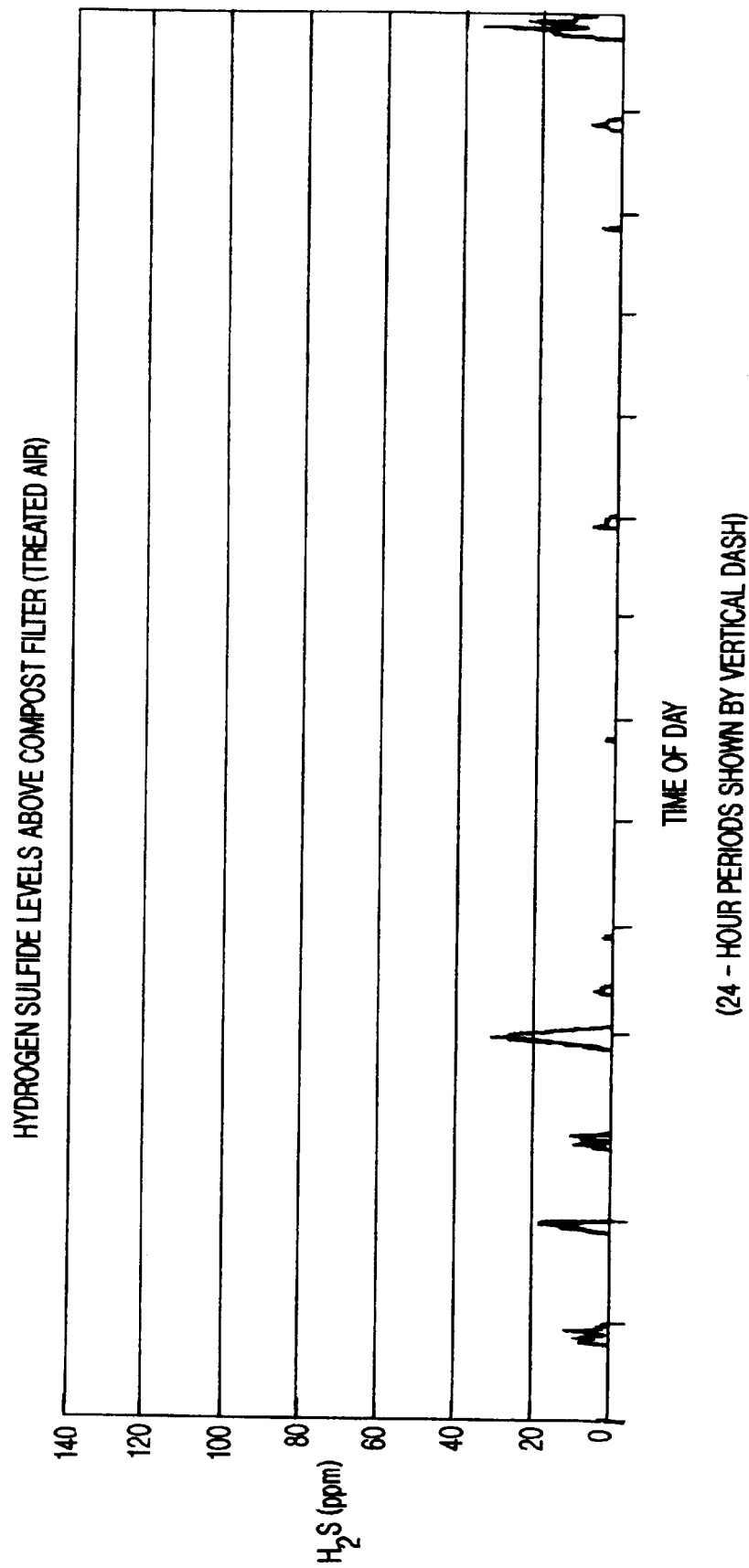
FIG. 8 is a graph of "above filter" hydrogen sulfide levels versus time of day for a second test of the biofilter of the invention.

FIGS. 7 and 8 provide graphs of performance data for the second test (hydrogen sulfide levels in ppm versus time of day), FIG. 7 showing hydrogen sulfide levels in the untreated air of the sanitary sewer below the manhole biofilter of the invention and FIG. 8 showing the decreased hydrogen sulfide levels in the treated air above the manhole biofilter of the invention. The biofilter used in this test was the same as the first test. Again, the small spikes of hydrogen sulfide above the filter indicate gas is moving through the filter and is not plugging the manhole neck.

Figure 9:
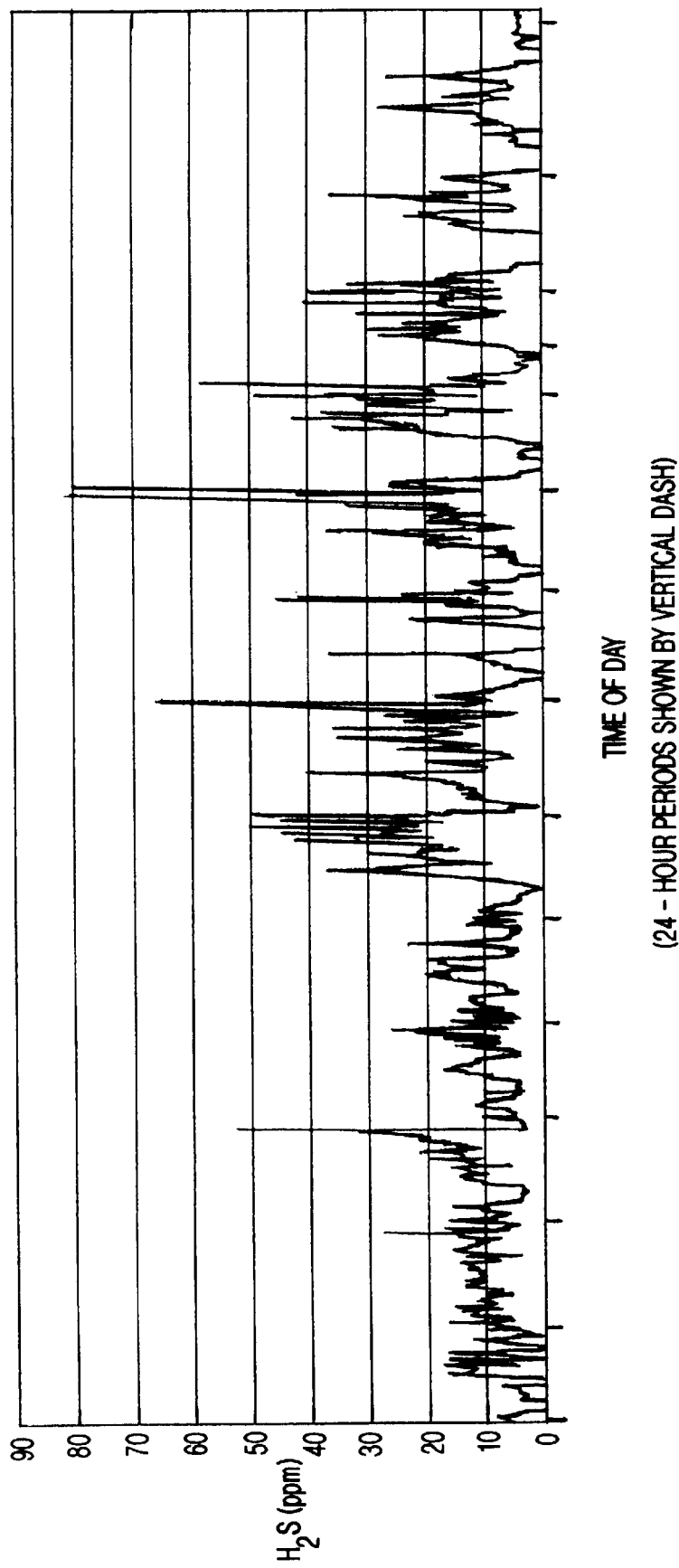
FIG. 9 is a graph of "below filter" hydrogen sulfide levels versus time of day for a third test of the biofilter of the invention.
Figure 10:
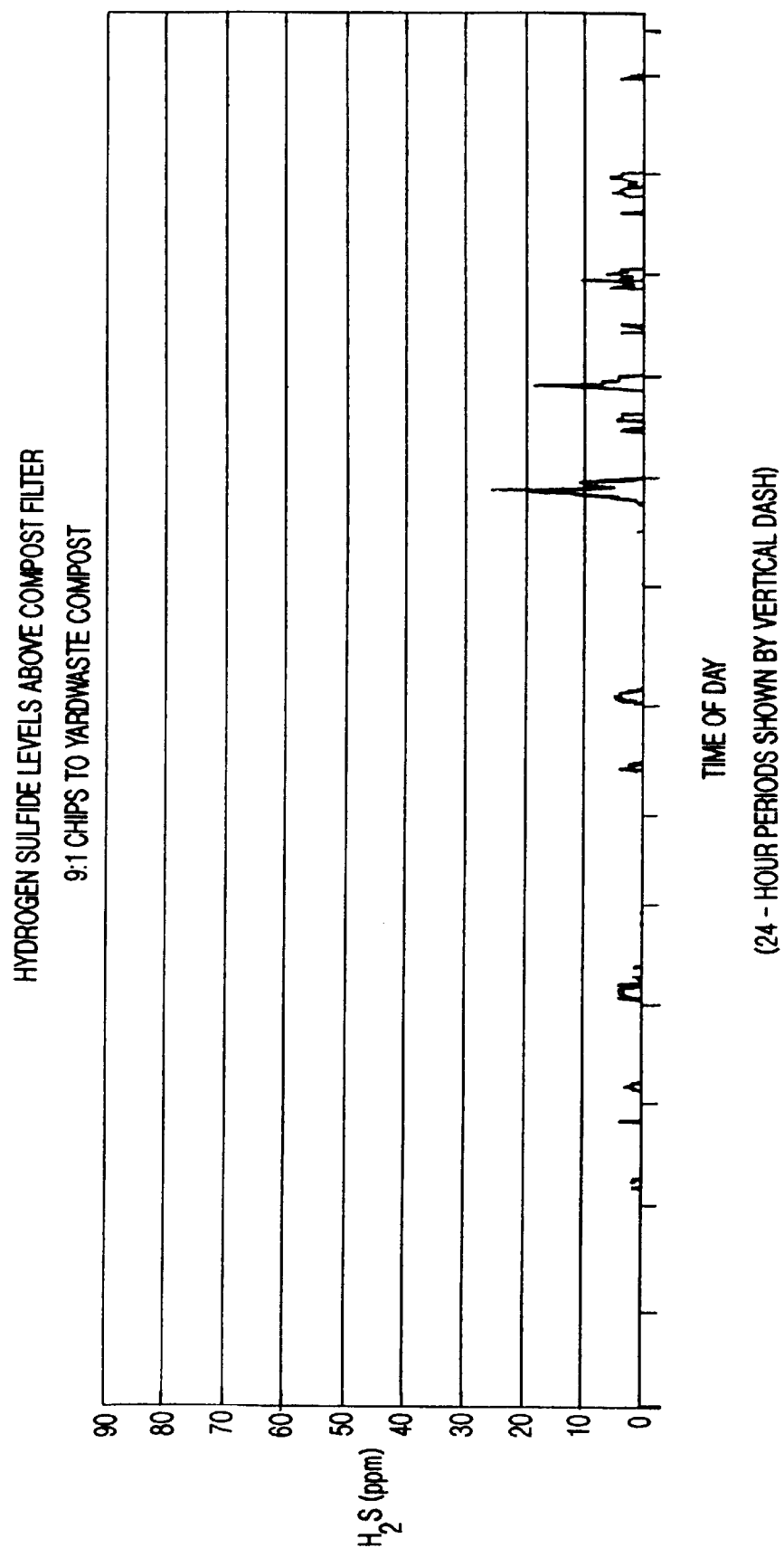
FIG. 10 is a graph of "above filter" hydrogen sulfide levels versus time of day for a third test of the biofilter of the invention.

FIGS. 9 and 10 provide graphs of performance data for the third test (hydrogen sulfide levels in ppm versus time of day), FIG. 9 showing hydrogen sulfide levels in the untreated air of the sanitary sewer below the manhole biofilter of the invention and FIG. 10 showing the decreased hydrogen sulfide levels in the treated air above the manhole biofilter of the invention. The biofilter used in this test was of the same construction as the previous two tests. clippings, not biosolids, as the nitrogen clippings, not biosolids, as the nitrogen source. Compost used was 9:1 wood chips to yard waste compost. Again, the results indicate treated gas is passing through the filter.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above, are hereby incorporated by reference.

What is claimed is:

1. A biofilter for use inside a neck of a manhole of a sanitary sewer system, said biofilter comprising:

air-permeable basket means for holding a loose filter media inside said basket means;

means for removably positioning said basket means in the neck of the manhole; and means for providing two-directional flow of gas upward and downward through said filter media.

2. The biofilter of claim 1 wherein said basket means comprises netting means for containing said filter media.

3. The biofilter of claim 1 wherein said filter media comprises compost.

4. The biofilter of claim 1 further comprising a shape-retaining ring means disposed at a perimeter of said basket means, wherein said shape-retaining ring means adjustably fits an inner diameter of the neck of the manhole, and means for attaching said shape-retaining ring means to said basket means.

5. The biofilter of claim 4 wherein said shape-retaining ring means further comprises a shelf means and said means for attaching rests on said shelf and pins said basket means to said shelf means.

6. The biofilter of claim 1 wherein said basket means further comprises a vertical containing structure for supporting said filter media.

7. The biofilter of claim 6 wherein said vertical containing structure comprises a plurality of cables disposed in evenly spaced relationship at a periphery of said basket means.

8. The biofilter of claim 1 wherein said means for removably positioning comprises vertical support means for retaining the biofilter in the manhole neck.

9. The biofilter of claim 8 wherein said vertical support means comprises holding means attached to the neck of the manhole and fastening means attached to a shape-retaining ring means, and further wherein said fastening means rests on said holding means.

10. The biofilter of claim 8 wherein said vertical support means comprises bolt means threaded through a shape-retaining ring means and bracket means formed in the neck of the manhole, and further wherein said bolt means fits into said bracket means to support the biofilter.

11. The biofilter of claim 1 wherein said means for providing two-directional flow through the filter media comprises means for forcing passage of gas through the filter media.

12. The biofilter of claim 11 wherein said means for forcing passage of gas through the filter media comprises a seal means disposed between a shape-retaining means and the manhole neck.

13. The biofilter of claim 1 wherein said means for providing two-directional flow through the filter media comprises means for utilizing an atmospheric pressure differential between the sanitary sewer system and an ambient pressure aboveground to drive air through the filter media.

14. The biofilter of claim 13 wherein gases in air moving upward through the filter media are chemically changed and rendered odorless by said filter media.

15. The biofilter of claim 13 wherein said means for providing two-directional flow comprises means for moving atmospheric air downward through said filter media to the sewer system.

\* \* \* \* \*